(12) United States Patent
Anastasov et al.

(10) Patent No.: US 11,121,810 B2
(45) Date of Patent: Sep. 14, 2021

(54) RADAR INTERFACE WITH ENHANCED FRAME SIGNAL

(71) Applicant: Infineon Technologies AG, Neubiberg (DE)

(72) Inventors: Ljudmil Anastasov, Munich (DE); Markus Bichl, Westerham (DE)

(73) Assignee: Infineon Technologies AG

( * ) Notice: Subject to any disclaimer, the term of this patent is extended or adjusted under 35 U.S.C. 154(b) by 0 days.

(21) Appl. No.: 16/585,811

(22) Filed: Sep. 27, 2019

(65) Prior Publication Data

US 2020/0244398 A1    Jul. 30, 2020

Related U.S. Application Data

(60) Provisional application No. 62/796,325, filed on Jan. 24, 2019.

(51) Int. Cl.

| | |
|---|---|
| *H04L 1/00* | (2006.01) |
| *H04B 7/0413* | (2017.01) |
| *H04L 7/033* | (2006.01) |
| *H04L 25/49* | (2006.01) |
| *G01S 7/00* | (2006.01) |

(52) U.S. Cl.
CPC ......... *H04L 1/0063* (2013.01); *H04B 7/0413* (2013.01); *H04L 1/001* (2013.01); *H04L 1/0042* (2013.01); *H04L 7/0331* (2013.01); *H04L 25/4902* (2013.01); *G01S 7/003* (2013.01)

(58) Field of Classification Search
CPC ..... H04L 1/0063; H04L 1/001; H04L 1/0042; H04L 7/0331; H04L 25/4902; H04L 7/0091; H04L 1/0041; H04B 7/0413; G01S 7/003
See application file for complete search history.

(56) References Cited

U.S. PATENT DOCUMENTS

| | | | | |
|---|---|---|---|---|
| 5,564,061 | A | * | 10/1996 | Davies ................ G06F 13/4018 703/27 |
| 2004/0246891 | A1 | | 12/2004 | Kay et al. |
| 2007/0008218 | A1 | | 1/2007 | Vantalon et al. |
| 2010/0271509 | A1 | | 10/2010 | Marumoto et al. |
| 2010/0272162 | A1 | | 10/2010 | Simeon et al. |
| 2018/0039598 | A1 | * | 2/2018 | Mishra ..................... H04L 7/044 |
| 2020/0195235 | A1 | * | 6/2020 | Poulsen ............ H04L 12/40019 |

FOREIGN PATENT DOCUMENTS

WO    2018104929 A1    6/2018

* cited by examiner

*Primary Examiner* — Sophia Vlahos
(74) *Attorney, Agent, or Firm* — Design IP

(57) ABSTRACT

A synchronous communication interface includes at least one data channel configured to carry a data signal comprising a plurality of data units; a control channel parallel to the at least one data channel, the control channel configured to carry a control signal for the at least one data channel; and a circuit configured to generate the control signal that includes control information that defines each of the plurality of data units in each data signal and further includes additional information. The circuit is configured to vary a duty cycle of the control signal according to a mapping of the additional information to a plurality of discrete duty cycle states.

22 Claims, 9 Drawing Sheets

RADAR INTERFACE WITH ENHANCED FRAME SIGNAL

CROSS-REFERENCE TO RELATED APPLICATIONS

This application claims the benefit of U.S. Provisional Application Ser. No. 62/796,325 filed on Jan. 24, 2019, which is incorporated by reference as if fully set forth.

FIELD

The present disclosure relates generally to a communication interface, and, more particularly, to a communication interface for transmitting control information and additional data information in a single signal.

BACKGROUND

Radio-frequency (RF) transmitters and receivers are found in a multiplicity of applications, in particular in the field of wireless communication and radar sensors. In the automotive sector, there is an increasing need for radar sensors which are used in so-called adaptive cruise control (ACC, or Radar Cruise Control) systems. Such systems can automatically adapt the speed of an automobile in order to thus maintain a safe distance to other automobiles traveling in front (and from other objects and pedestrians). Further applications in the automotive sector are, for example, blind spot detection, lane change assist and the like.

Modern radar systems use highly integrated RF circuits which can combine all core functions of an RF frontend of a radar transceiver in a single housing (single-chip radar transceiver), which is often referred to as a monolithic microwave integrated circuit (MMIC). Such RF frontends usually comprise, inter alia, a voltage-controlled oscillator (VCO) connected in a phase-locked loop, power amplifiers (PA), directional couplers, mixers and analog-to-digital converters (ADC) as well as associated control circuit arrangements for controlling and monitoring the RF frontend.

Modern frequency-modulated continuous-wave (FMCW) radar systems are often multi-input/multi-output (MIMO) systems having a plurality of transmission (TX) and reception (RX) channels. MIMO systems usually comprise a plurality of MMICs which are arranged on a carrier board (e.g., a printed circuit board) and must operate in a synchronous manner, wherein each MMIC per se may have a plurality of RX and TX channels. One objective may be considered to be the (in-phase) synchronization of a MIMO radar system having a plurality of MMICs.

Each MMIC may communicate with a system controller. However, in current radar systems, each MMIC sends only raw radar data to the system controller, with frequent pauses between active periods which are unused. In addition, the system controller may discard whole measurement cycles if an error occurs in the data stream, because it cannot assess the severity of the error.

Therefore, an improved communication interface between radar chips and system controllers that may increase data throughput may be desirable.

SUMMARY

Embodiments provide a synchronous communication interface that includes at least one data channel configured to carry a data signal comprising a plurality of data units; a control channel parallel to the at least one data channel, the control channel configured to carry a control signal for the at least one data channel; and a circuit configured to generate the control signal that includes control information that defines each of the plurality of data units in each data signal and further includes additional information. The circuit is configured to vary a duty cycle of the control signal according to a mapping of the additional information to a plurality of discrete duty cycle states.

Embodiments provide a method of synchronous communication, including synchronously transmitting at least one data signal comprising a plurality of data units, in parallel with a control signal for the at least one data signal; and generating the control signal that includes control information that defines each of the plurality of data units in each data signal and includes additional information, including varying a duty cycle of the control signal according to a mapping of the additional information to a plurality of discrete duty cycle states.

Embodiments provide a synchronous communication interface that includes at least one data channel configured to carry a data signal comprising a plurality of data units; a control channel parallel to the at least one data channel, the control channel configured to carry a control signal that includes control information that defines each of the plurality of data units in each data signal and further includes additional information, where the control signal has a duty cycle that varies according to a mapping of the additional information to a plurality of discrete duty cycle states; and a circuit configured to decode the control signal, including identifying each of the plurality of data units in each data signal from the control signal, determining the duty cycle of the control signal, and further determining the additional information from the determined duty cycle based on the mapping of the additional information to the plurality of discrete duty cycle states.

Embodiments provide a synchronous communication interface that includes: at least one data channel configured to carry a data signal including a plurality of data units; a control channel parallel to the at least one data channel, the control channel configured to carry a control signal for the at least one data channel; and a circuit configured to generate the control signal including a plurality of frame periods, wherein the control signal includes control information that defines each of the plurality of data units in each data signal and further includes additional information. The circuit is configured to vary a frame length of the plurality of frame periods of the control signal according to a mapping of the additional information to a plurality of discrete frame lengths.

Embodiments provide a synchronous communication interface that includes: at least one data channel configured to carry a data signal including a plurality of data units; a control channel parallel to the at least one data channel, the control channel configured to carry a control signal that includes control information that defines each of the plurality of data units in each data signal and further includes additional information, wherein the control signal includes a plurality of frame periods that have corresponding frame lengths that vary according to a mapping of the additional information to a plurality of discrete frame lengths; and a circuit configured to decode the control signal, including identifying each of the plurality of data units in each data signal from the control signal, determining the corresponding frame length of the control signal for each of the plurality of frame periods, and further determining the additional information from the determined corresponding frame length based on the mapping of the additional information to the plurality of discrete frame lengths.

Embodiments provide a method of synchronous communication that includes: synchronously transmitting at least one data signal including a plurality of data units, in parallel with a control signal for the at least one data signal; and generating the control signal that includes control information that defines each of the plurality of data units in each data signal and includes additional information, including varying a frame length of the control signal according to a mapping of the additional information to a plurality of discrete frame lengths.

BRIEF DESCRIPTION OF THE DRAWINGS

Embodiments are described herein making reference to the appended drawings.

DETAILED DESCRIPTION

Figure 1:
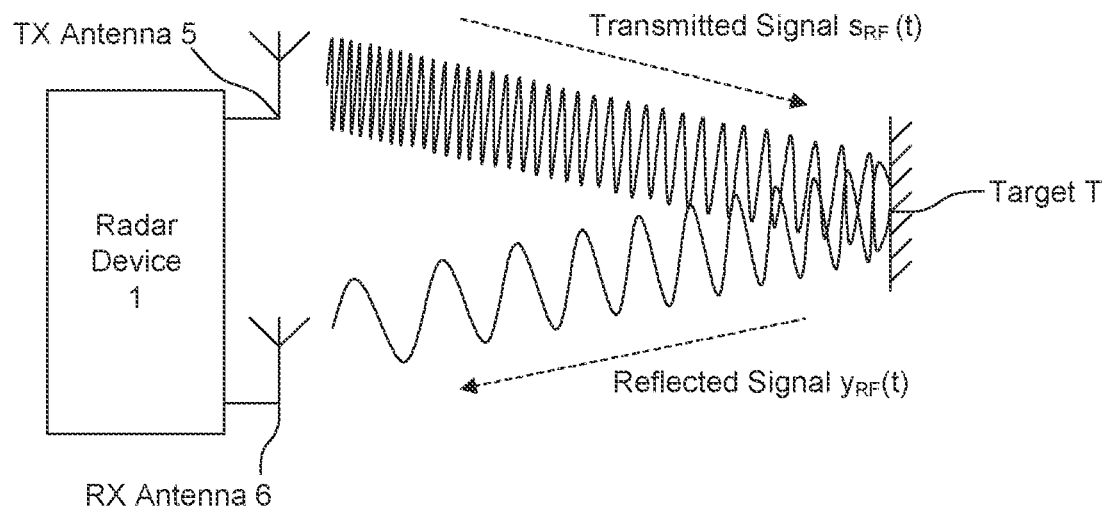
FIG. 1 is a drawing illustrating the operating principle of a frequency-modulated continuous-wave (FMCW) radar system for measuring distance and/or speed.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments are discussed below in the context of a radar receiver or transceiver. However, it should be noted that the embodiments may also be applied in applications different from radar such as, for example, RF transceivers of RF communication devices. In fact, almost any RF circuitry with multiple RF channels may take advantage of the concepts described herein.

FIG. 1 illustrates a frequency-modulated continuous-wave (FMCW) radar system 1 according to one or more embodiments. In the present example, separate transmission (TX) and reception (RX) antennas 5 and 6, respectively, are used. However, it is noted that a single antenna can be used so that the transmission antenna and the reception antenna are physically the same (monostatic radar configuration). The transmission antenna continuously radiates an RF signal $s_{RF}(t)$, which is frequency-modulated, for example, by a periodic linear frequency ramp signal (also referred to as frequency sweep or chirp signal). The transmitted signal $s_{RF}(t)$ is back-scattered at a target T, which is located in the radar channel within the measurement range of the radar device. The back-scattered signal $y_{RF}(t)$ is received by the reception antenna 6. In the depicted example, the back-scattered signal is denoted as $y_{RF}(t)$.

Figure 2:
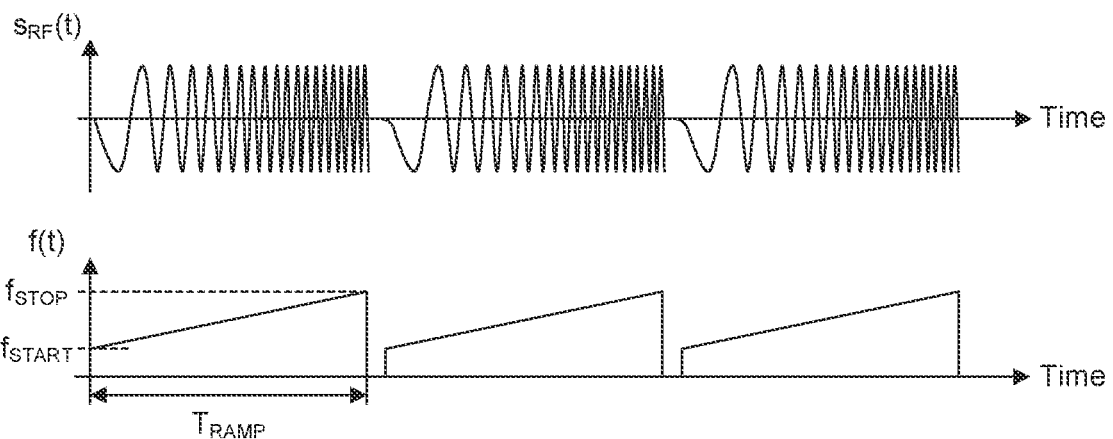
FIG. 2 includes two timing diagrams illustrating the frequency modulation of the radio frequency (RF) signal used in FMCW radar systems.

FIG. 2 illustrates the mentioned frequency-modulation of the signal $s_{RF}(t)$ according to one or more embodiments. As shown in the first diagram of FIG. 2, the signal $s_{RF}(t)$ may be composed of a series of "ramps", i.e., a sinusoidal waveform with increasing (up-chirp) or decreasing (down-chirp), separated by a short pause. Several ramps with short pauses in between make up a "chirp". Radar sends sequences of frames or data units during a single "ramp" which represents one radar measurement. In addition, there is a longer pause between chirps. In the present example, a single chirp composed of three ramps is shown. A long pause follows the third ramp, after which another chirp is started. Thus, each ramp includes a plurality of frames, and each chirp includes a plurality of ramps and a plurality of short pauses between ramps.

The instantaneous frequency f(t) of a ramp increases linearly from a start frequency $f_{START}$ to a stop frequency $f_{STOP}$ within a defined time span $T_{RAMP}$ (see second diagram of FIG. 2). Such a ramp is also referred to as a linear frequency ramp. Three identical linear frequency ramps are illustrated in FIG. 2. It is noted, however, that the parameters $f_{START}$, $f_{STOP}$, $T_{RAMP}$ as well as the pause between the individual frequency ramps may vary dependent on the actual implementation and use of the radar device 1. In practice, the frequency variation may be, for example, linear (linear ramp, frequency ramp), exponential (exponential ramp), or hyperbolic (hyperbolic ramp).

Figure 3:
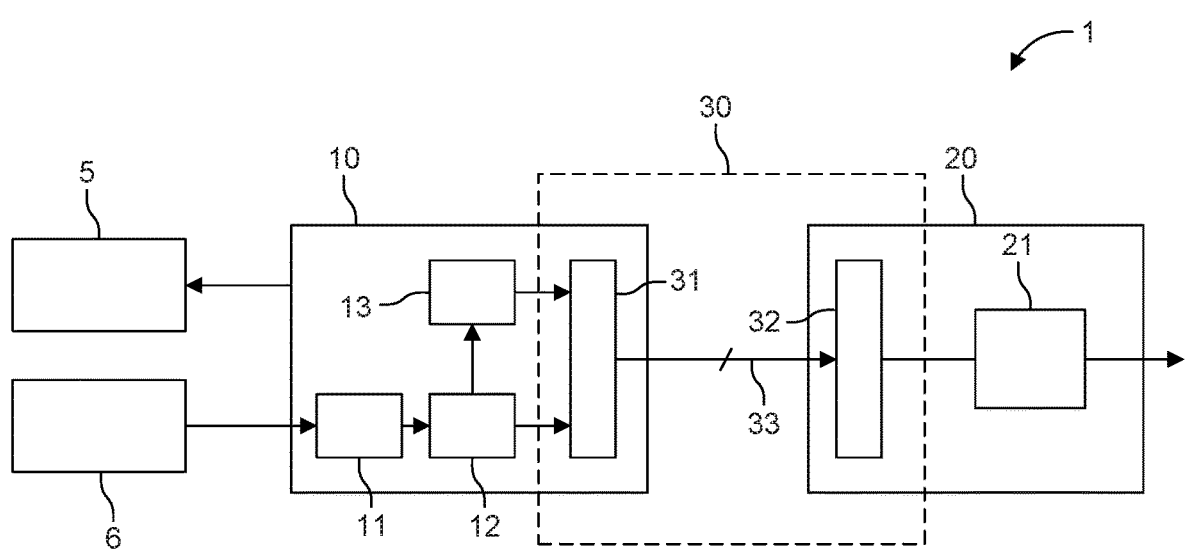
FIG. 3 is a schematic block diagram illustrating the basic structure of an FMCW radar device.

FIG. 3 is a schematic block diagram that illustrates an example structure of a radar device 1 (radar sensor) according to one or more embodiments. It is noted that a similar structure may also be found in RF transceivers used in other applications such as, for example, in wireless communications systems. Accordingly, at least one transmission antenna 5 (TX antenna) and at least one reception antenna 6 (RX antenna) are connected to an RF frontend 10, which may be integrated in a monolithic microwave integrated circuit (MMIC) to comprise a radar chip. The RF frontend 10 may include all the circuit components needed for RF signal processing. Such circuit components may (but need not necessarily) include, for example, a local oscillator (LO), an electronic oscillator to generate a stable clock signal, an analog-to-digital converters (ADC) to digitalize analog signals, RF power amplifiers, low noise amplifiers (LNAs), directional couplers such as rat-race-couplers and circulators, and mixers for the down-conversion of RF signals (e.g., the received signal $y_{RF}(t)$, see FIG. 1) into the base-band or an intermediate frequency (IF) band.

In particular, the RF frontend 10 includes a base-band signal processing circuit 11 configured to down-convert the received RF signals $y_{RF}(t)$ and an ADC 12 to digitize the down-converted signal. The RF frontend 10 may then be configured to transmit the digitized signal as digital data to another chip 20 (e.g., a processing chip) that includes a digital signal processor (DSP) 21 that processes the digitized signal in the digital domain. Additionally, the RF frontend 10 may include a DSP 13 that performs some processing on the digitized signal prior to transmitting the digitized signal to the processing chip 20. For example, the DSP 13 of the RF frontend 10 may perform low performance signal processing on the data signal and the DSP 21 of the processing chip 20 may perform higher performance signal processing.

It is noted that antenna-arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include multiple transmission (TX) channels and multiple reception (RX) channels, which among others allows the measurement of the direction (direction of arrival (DoA)), from which the radar echoes are received. However, in some implementations a single TX channel and RX channel may be implemented.

In the case of a frequency-modulated continuous-wave (FMCW) radar system, the transmitted RF signals radiated by the TX antenna 5 are in the range between approximately 20 GHz (e.g., 24 GHz) and 100 GHz (e.g., 77 GHz in automotive applications). As mentioned, the received RF signals $y_{RF}(t)$ are down-converted into the base band (or IF band) and further processed in the base band using analog signal processing by a base-band signal processing chain 11 of the RF frontend 10, which basically includes filtering and amplification of the base-band signal. The base-band signal (of IF-band signal) is finally digitized using one or more ADC 12 of the RF frontend 10 and further processed in the digital domain (e.g., signal processing chain implemented, e.g., in DSP 13 and/or DSP 21). The processing chip 20 may be configured to output the processed data, for example, to a system controller (not illustrated) which may be at least partly implemented using a processor, such as a microcontroller executing appropriate firmware.

A radar interface circuit 30 is also provided that connects the radar chip (i.e., the RF frontend 10) with the processing chip 20. The radar interface circuit 30 includes a transmitter interface circuit 31 at the radar chip 10 and a receiver interface circuit 32 at the processing chip 20 that communicate via a plurality of channels 33. The plurality of channels include a clock channel dedicated for transmitting a clock signal, a control channel dedicated for transmitting a control signal, and at least one data channel each dedicated for transmitting a different data signal.

The radar interface circuit 30 is a unidirectional synchronous communication interface that is responsible for synchronous communications to transmit radar data from the radar chip to the processing chip. The radar interface circuit 30 may also generate additional information, such as metadata regarding the radar data, and transmit the additional information to the processing chip using a control signal (e.g., a frame signal). The control signal is a PWM signal that has a variable duty cycle. For example, the radar interface circuit 30 may receive a frame signal from the RF frontend 10, along with a communication clock signal and one or more data signals, and modulate the width of frame pulses via PWM of the frame signal to convey different types of additional information. Thus, the duty cycle, the high-time, and/or the low-time of the frame signal may be used to convey additional information, making the frame signal a hybrid control/data signal.

In one example, the radar interface circuit 30 may store a mapping of different types of additional information to a plurality of discrete duty cycle states. The radar interface circuit 30 may include a state machine that refers to the mapping for modulating the duty cycle of the control signal. Here, the radar interface circuit 30 selects a duty cycle out of possible duty cycles that are each mapped to additional information. The state machine may make the selection according to one or more external inputs and each duty cycle may be mapped to different types of additional information such that each duty cycle conveys the additional information corresponding thereto. The radar interface circuit 30 can then vary the duty cycle of the control signal on a period-by-period basis (i.e., on a data frame-by-data frame basis) according to the additional information to be conveyed in a given period, with each period of the control signal corresponding to a segment (e.g., a data frame or a pause) in each data signal.

Synchronous serial communication is a serial communication protocol in which data is sent together with the transmitter clock signal. Synchronous communication requires that the clocks in the transmitting and receiving devices are synchronized—running at the same rate—so the receiver can sample the signal at the same time intervals used by the transmitter. In synchronous communications, data is frequently not sent as individual bytes, but as frames of larger data blocks, the size of which can vary according to the application. The clock may be embedded in the data stream encoding, or may be provided on separate clock lines such that the sender and receiver are always in synchronization during a frame transmission.

Figure 4:
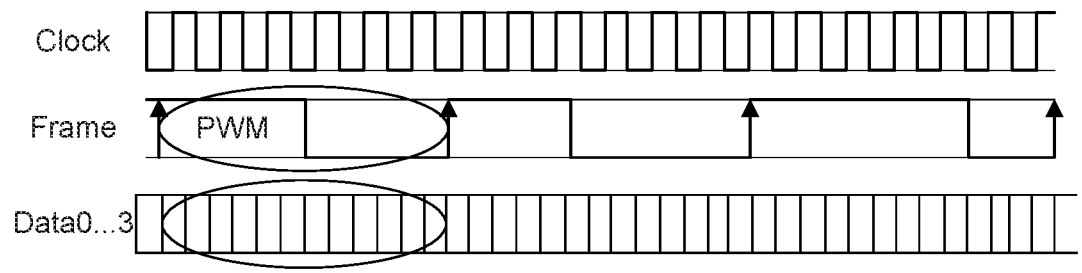
FIG. 4 is a signal diagram of a synchronous communication interface that includes a clock signal, a frame signal, and multiple data signals according to one or more embodiments.

FIG. 4 is a signal diagram of a synchronous communication interface that includes a communication clock signal, a frame signal, and multiple data signals in parallel according to one or more embodiments. In particular, the communication clock signal is used for synchronizing the communication between sender (e.g., radar chip 10) and receiver (e.g., processing chip 20). The frame signal is a control signal used to indicate an end of one data frame (i.e., an end of a radar sample) and a beginning of the next data frame (i.e., a start of the next radar sample). That is, each period of the control signal is equal in duration to the length of a corresponding segment of the data signal. For example, if a corresponding segment of the data signal is a data sample, the period of the control signal synchronous at that time is equal to the length of the data sample, which in turn corresponds to the number of bits of the data sample. If the corresponding segment of the data signal is a pause, the period of the control signal synchronous at that time is equal to the length of the pause. Thus, each period of the control signal is synchronous (i.e., transmitted in parallel) with a data unit (e.g., data frame) or other type of segment in each data signal.

Here, a first transition edge of the frame signal (i.e., either the rising edge or the falling edge) marks or flags the end of a data frame and simultaneously marks or flags the start of the next data frame. Thus, the sender can communicate to the receiver the point in the communication where one frame ends and the next frame begins via the frame signal. The receiver can then process the different data frames (radar samples) accordingly.

In addition, the sender my transmit data to the receiver on one or more data channels. In technical terms, the "payload" of the frame is the data field and contains the radar data being transmitted. Each bit of data is transmitted as low (0) or high (1) with rigorous equal timing. The data bit order is least significant bit (LSB) to most significant bit (MSB).

Following the data field may be two bytes comprising a Cyclic Redundancy Check (CRC) (not illustrated). The value of these bytes is the result of an arithmetic calculation based on every bit of data between the flags (i.e., the data in a single frame). When the data frame is received, the calculation is repeated and compared with the received CRC bytes. If the answers match, then there is a high degree of certainty that the data frame has been received exactly as transmitted. If there is a CRC error, the received data frame may be discarded.

According to the embodiments described herein, a second transition edge of the frame signal (i.e., the one not used to delimit the end of a frame and start of the next frame) may be used to convey additional information to the receiver. In the current examples, the first transition edge will correspond to the rising edge of the frame signal and the second transition edge will correspond to the falling edge of the frame signal. However, the opposite may also be implemented.

In typical radar interface schemes, the frame signal is restricted to a 50% duty cycle and a fixed frame length, and the second transition edge has no meaning. The frame length or a signal length as defined herein is one signal period, where a signal period is the time it takes for the signal to complete an on-and-off cycle. However, in the present embodiments, the frame signal is configured with a varying duty cycle that may have multiple meanings. Specifically, the timing of the second transition edge of the frame signal may be adjusted incrementally in steps by the radar interface circuit 30 to convey different information. Each increment of multiple possible increments of the second transition edge may be equivalent to one-bit in duration (i.e., the width of each increment is one bit in time). In other words, the width of a frame pulse in the frame signal may be adjusted incrementally based on the width of a single bit, which is equivalent to a width of one clock pulse of the communication clock signal. Thus, the frame signal serves as a hybrid control/data signal that provides control information as well as data information. For this reason, the frame signal has a control function as well as a data function and may be referred to as a limited data channel or a hybrid control-data channel in which control information and data are simultaneously transmitted therethrough.

For example, for 12-bit data (radar) samples, a single frame carries twelve data bits. In this case, the frame pulse can have up to eleven different states. In other words, the second transition edge can occur in one of eleven different positions for each frame, each position corresponding to a different state and/or conveying potentially a different piece of coded information to the receiver. Accordingly, the pulse width of the frame signal may vary between eleven different pulse widths, each corresponding to a different state, and each state conveying potentially a different piece of coded information.

It is noted that the number of possible states for the second transition edge is one less than the number of bits being transmitted in a data frame. This is because there must be a second transition edge between consecutive frames such that a first transition edge can indicate the end of one frame and the start of the next frame. Otherwise, the receiver would not be able to distinguish the data frames. Thus, there is always at least one clock cycle on the far left side or on the far right side of the data frame at which the frame signal has transitioned from high to low or low to high.

In summary, the first transition edge (rising or falling edge) of the frame signal is used to indicate a frame end/next frame start and the second transition edge is used to transfer additional information. The duty cycle of the frame signal can be used to transfer information of up to $\log_2(N-1)$ bits, where N is the data sample length and N−1=M, where M is a number of PWM steps. Again, for 12-bit data samples (i.e., N=12; M=11), the frame signal can transfer approximately 3.45 bits for each data frame by using one of eleven discrete duty cycle levels available. Thus, M PWM steps code $\log_2(M)$ bits. In one example, various types of metadata related to one or more data streams may be encoded in the frame signal for each frame based on the duty cycle of the frame signal.

In addition, it is possible not only to transfer information during a frame, but it is also possible to transfer information during the time between the ramps (i.e., during a short pause), where one specific duty cycle level could be used to mark a standard ADC sample frame, and other duty cycle levels could be used to make other types of data frames containing additional information. An ADC sample frame is data output from the ADC 12 of the RF frontend 10, and may correspond to a sample of analog radar data received at Rx antenna 6 and converted into digital data by the ADC 12.

Similarly, the frame signal could be used to transfer information during the time between chirps (i.e., during a long pause). In some circumstances, the frame signal may be used to indicate or mark the end of a ramp or the end of a chirp.

The signal diagram shown in FIG. 4 also includes four serial data signals Data0, Data1, Data2, and Data3 (i.e., Data0-3), each of which is transmitted on a separate data channel. Thus, the radar interface circuit may include multiple data channels used to transmit multiple data streams, each of which may correspond to a different RX antenna 6. The data streams share the same communication clock signal and frame signal.

Figure 5:
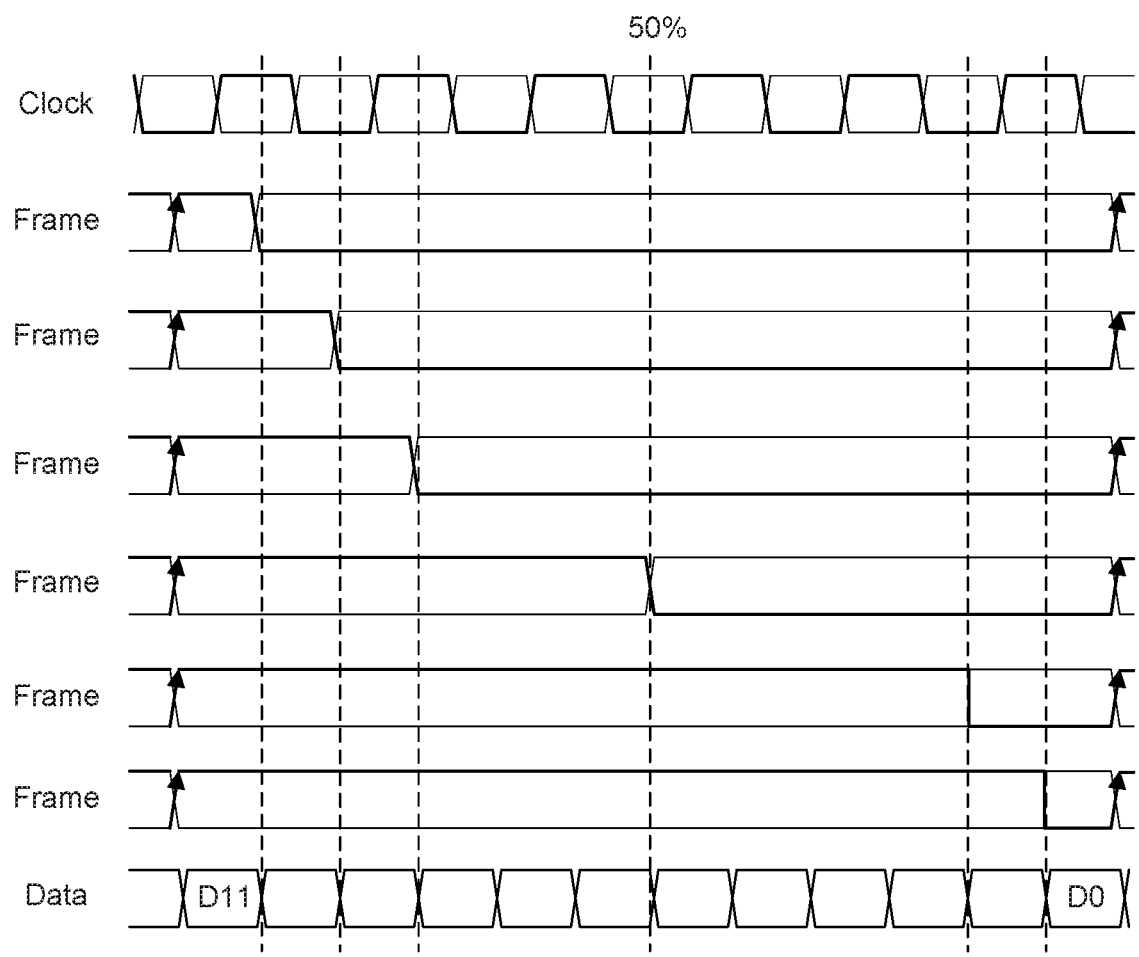
FIG. 5 shows a signal diagram of a synchronous communication interface that includes a clock signal, a frame signal, and multiple data signals according to one or more embodiments.

FIG. 5 shows a signal diagram of a synchronous communication interface that includes a communication clock signal, a frame signal, and multiple data signals according to one or more embodiments. In particular, FIG. 5 shows different PWM granularities or steps utilized by the frame signal to convey different information. It is noted that, while possible, it is not necessary that all possible steps are used to convey additional information. For example, only six different PWM steps of the possible eleven steps are shown in FIG. 5 for the frame signal, while in practice more than six or less than six PWM steps may be implemented.

Different PWM widths (i.e., duty cycles) may indicate one or more of the following: a metadata status bit, a frame type, a parity bit, and a safety bit, but it not limited thereto.

A parity bit, or check bit, is a bit "added" to a string of binary code to ensure that the total number of 1-bits in the string is even or odd. Thus, parity bits can be used as an error detecting code. There are two variants of parity bits: even parity bit and odd parity bit.

In the case of even parity, for a given set of bits in a data frame, the occurrences of bits whose value is 1 is counted. If that count is odd, the parity bit value is set to 1, making the total count of occurrences of is in the whole set (including the parity bit) an even number. If the count of is in a given set of bits is already even, the parity bit's value is 0.

In the case of odd parity, the coding is reversed. For a given set of bits, if the count of bits with a value of 1 is even, the parity bit value is set to 1 making the total count of is in the whole set (including the parity bit) an odd number. If the count of bits with a value of 1 is odd, the count is already odd so the parity bit's value is 0.

Thus, two different PWM widths may be used for the parity bit, where one PWM width is used to indicate a value of 1 and another PWM width is used to indicate a value of 0. The processing chip 20 receiving the modulated (coded) frame signal and then determine the value of the parity bit from the frame signal, and perform an error check on the corresponding data frame in the received data signal.

A metadata status bit may indicate whether temperature, voltage, system clock, and/or a phase-locked loop are OK (i.e., that each are within a normal operating range). This type of metadata status bit may be referred to as a temperature-voltage-clock (TVC) bit that indicates whether these system parameters are all OK. The system parameters may be specific to the MMIC radar chip (i.e., the RF frontend 10).

Thus, two different PWM widths may be used for a metadata status, where one PWM width indicates that the status is OK, and another PWM width indicates that the status is not OK—signaling that at least one of the system parameters is outside of its normal operating range. The processing chip 20 receiving the modulated (coded) frame signal and then determine the value of the metadata status bit from the frame signal, and determine the status of the system or the MMIC radar chip. If there is a system error or chip error (i.e., the status bit is not OK), the processing chip 20 can generate a warning signal, perform additional checks, and/or take other appropriate countermeasures (if possible) to correct the error.

Alternatively, each system/chip parameter (e.g., temperature, voltage, system clock, a phase-locked loop, current, etc.) may have its own metadata status bit assigned thereto or may be combined in a different matter (e.g., temperature with voltage and system clock with phase-locked loop). Thus, two different PWM widths may be used for each different type metadata status, the metadata status representing either a signal system parameter or a combination of system or chip parameters.

A safety bit is a status bit in which multiple status bits are "OR'd" together. In essence, the safety bit is an OK signal or an OK bit derived from an OR operation applied to multiple status bits. If any one of the status bits indicates an error, the safety bit will indicate a "not OK" bit. Otherwise, an "OK" bit is indicated. Thus, the safety bit indicates whether the radar chip is operating normally or abnormally. Thus, two different PWM widths may be used for the safety bit, one indicating "OK" and the other indicating "not OK" (i.e., an error flag).

A frame type may correspond to the type of data being transmitted in a corresponding data frame. For example, the data type within the payload of a data frame may be an ADC data sample (e.g., radar data), temperature data, voltage data, metadata, CRC, etc. The type of data is not limited to particular types and may depend on the application and system in which the communication interface is implemented. For example, the communication interface may be implemented in systems other than radar systems, and the type of data transmitted to a microcontroller may vary. In this case, a different PWM width may be used for each different data type, where some or all possible PWM widths are used to indicate the data type of the data frame transmitted in a data channel. The processing chip 20 receiving the modulated (coded) frame signal and then determine the data type of a corresponding data frame, and perform different types of signal processing on the data signal for that data frame based on the determined data type. Thus, the data can be processed differently by the processing chip 20 depending on the determined data type.

It is also possible to mix the coding of a parity bit with the frame type. For example, PWM widths that correspond to less than a 50% duty cycle may indicate an odd parity bit and different PWM widths between a 0% and 50% duty cycle (non-inclusive) may correspond to one of X frame types. Additionally, PWM widths that correspond to more than a 50% duty cycle may indicate an even parity bit and different PWM widths between a 50% and 100% duty cycle (non-inclusive) may correspond to one of the same X frame types. Here, the number of different frame types that can be indicated is essentially reduced in half so that a parity bit can be coded into the frame signal. The processing chip 20 may receive the modulated (coded) frame signal and then determine the value of the parity bit from the frame signal and perform an error check on the corresponding data frame in the received data signal, and additionally determine the data type of a corresponding data frame and perform different types of signal processing on the data signal for that data frame based on the determined data type. The 50% duty cycle can also be used to indicate different information when a parity check is not being performed.

The same mixed scheme can also be used for a metadata status bit, where PWM widths that correspond to less than a 50% duty cycle may indicate an OK status, and PWM widths that correspond to more than a 50% duty cycle may indicate a NOT OK status. Different frame types can then be coded into the frame signal as similarly described above.

In another example, two data types can be indicated along with a status indicator associated with that data type. For example, PWM widths that correspond to less than a 50% or 60% duty cycle may indicate a first data type with two or three different PWM widths indicating a status of the first data type. For example, the first data type may be a voltage, and one PWM width may indicate an undervoltage, one PWM width may indicate an overvoltage, and one PWM width may indicate a normal voltage. In addition, PWM widths that correspond to more than a 50% or 60% duty cycle may indicate a second data type, such as temperature. Here, on PWM width may indicate a normal temperature and a second PWM width may indicate an overtemperature.

This mixed scheme may be applied to any type of binary indicator bit (e.g., parity bit, status bit, etc.). If an indicator bit has more than two (binary) status, the duty cycle can be segmented further (i.e., into thirds, quarters, etc.). However, the different number of frame types that can be indicated is also reduced since each duty cycle segment should code the same set of frame types.

The communication interface 30 may be configured to operate in compatibility mode or non-compatibility mode.

In compatibility mode, a present duty cycle (e.g., 50%) during data acquisition may indicate a frame type as an ADC sample (i.e., a data sample). In addition, the pause time between the ramps can be used where other duty cycles are used to convey information. For example, during a pause between ramps (timeout, longer frame time period), log2 (P−1) bits of data could be transferred depending on the length of the pause, where the length of the pause is P bits.

In non-compatibility mode, many different and enhanced ways are possible of handling the data stream itself, the pause between the ramps, and the pause between the chirps.

Figure 6:
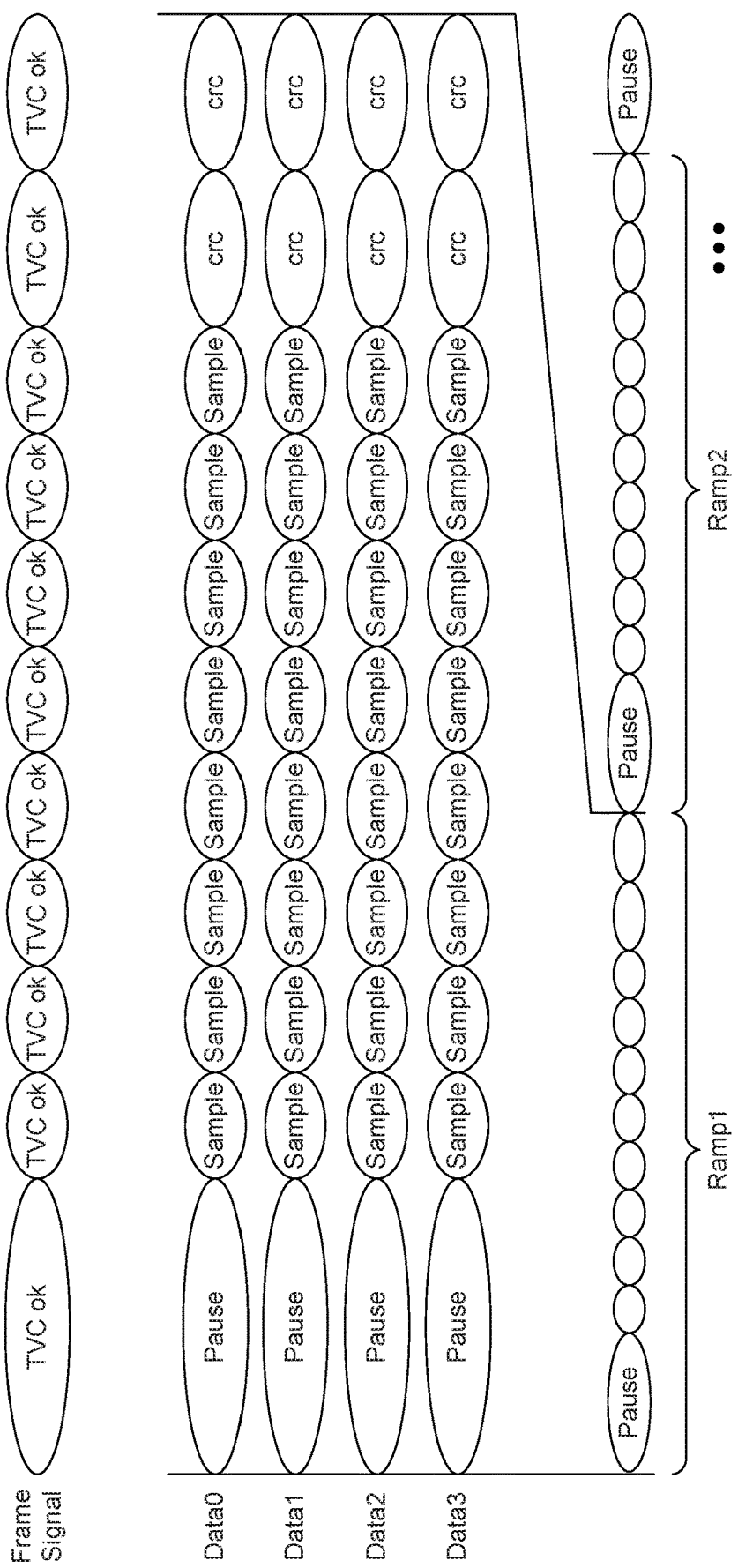
FIG. 6 shows an example signal diagram of serial signals transmitted by a synchronous communication interface according to one or more embodiments.

FIG. 6 shows an example signal diagram of serial signals transmitted by a synchronous communication interface according to one or more embodiments. In particular, the signal diagram includes a frame signal transmitted over a control channel and four data signals transmitted over four parallel data channels Data0-3, where the frame signal is also transmitted in parallel to the data signals. The segment of the frame signal shown in FIG. 6 corresponds to one ramp (Ramp1) of a chirp. Thus, each data signal Data0-3 includes a long pause, followed by a series of samples (i.e., data frames that carry ADC samples of radar data), further followed by two CRCs. A second ramp (Ramp2) follows the first ramp.

Each "bubble" in the frame signal represents one signal period that includes a PWM cycle or frame pulse having a rising and falling edge and that corresponds to corresponding "bubbles" in the data signals. Each signal period may be a length of a predetermined number of clock pulses of the communication clock signal. For example, a bubble in the frame signal may be transmitted in parallel with synchronous samples transmitted in the data signals. The frame signal in this bubble may indicate information related to the system or to the sample itself. For example, in this example, each frame signal bubble indicates a system status related to TVC, and thus indicates whether system or chip parameters TVC are OK or not OK. One possibility is to send an OK status if the temperature and voltage of the MMIC radar chip are within a normal operating range, and that, if the system clock is OK, that the PLL of the MMIC radar chip is locked. Another possibility is to transmit content of the MMIC radar chip's internal registers that are monitored by the processing chip 20.

Therefore, the processing chip 20 is not only notified of the end/start of each sample (each frame), but also receives TVC status information and can monitor the system or chip parameters for irregularities. This status information can also be transmitted in the frame signal during the long pause and during the CRCs.

Figure 7:
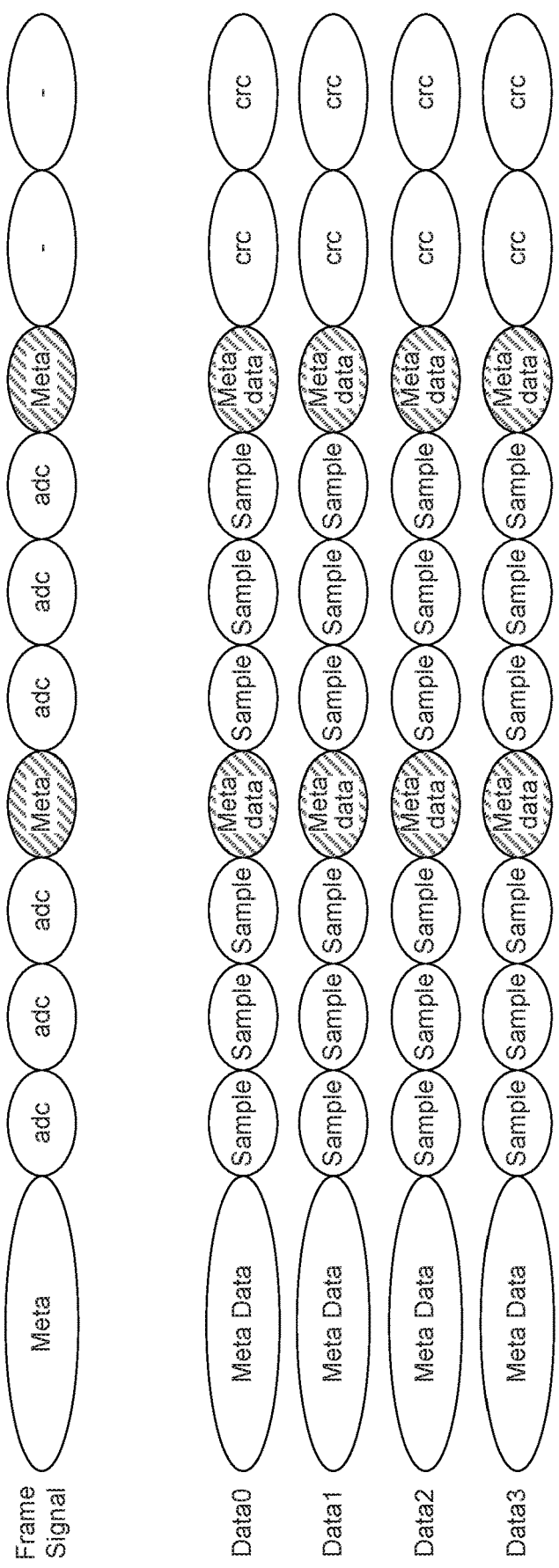
FIG. 7 shows an example signal diagram of serial signals transmitted by a synchronous communication interface according to one or more embodiments.

FIG. 7 shows an example signal diagram of serial signals transmitted by a synchronous communication interface according to one or more embodiments. In particular, the data signals Data0-3 carry ADC samples interleaved with metadata. Metadata in the data signal may include a MMIC status, MMIC register values, or an extra parity and CRC of two or more previous ADC samples.

Each data signal Data0-3 carries the same data type in parallel to each other, referred as synchronous information. The frame signal in this case is configured to indicate a frame type or data type of each corresponding frame in the data signals. Thus, when the data signals are transmitting metadata, the frame pulse in the frame signal indicates a metadata frame type. Similarly, when the data signals are transmitting sample data, the frame pulse in the frame signal indicates a data sample or payload frame type. During transmission of a CRC in the data signal, the frame signal does not indicate any frame type information. Here, it is possible that status information can be transmitted in the frame signal instead.

Figure 8:
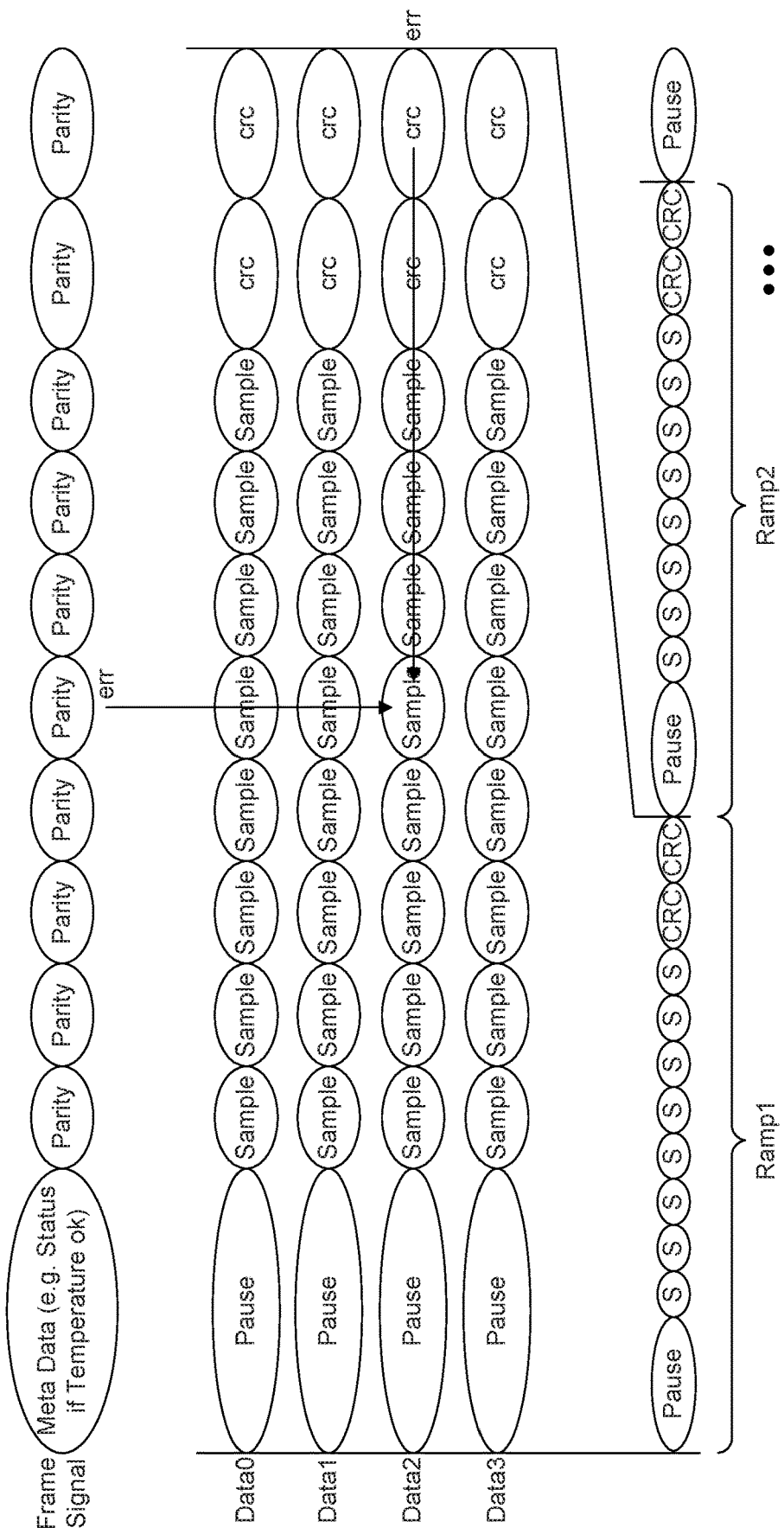
FIG. 8 shows an example signal diagram of serial signals transmitted by a synchronous communication interface according to one or more embodiments.

FIG. 8 shows an example signal diagram of serial signals transmitted by a synchronous communication interface according to one or more embodiments. In particular, the data signals Data0-3 carry ADC samples and CRCs, and the frame signal contains one parity bit for all four data samples in a corresponding column. That is, the parity bit is calculated across all channels using a sample from each data signal that is transmitted in parallel (synchronously) with the frame pulse. Alternatively, the frame pulse may contain two parity bits, for example, one for DATA0,1 and one for DATA2,3. Alternatively, the frame signal may include a parity bit for all data fields separately.

The receiver module at the processing chip 20 keeps track at which frame number a parity error occurred. This can be combined with the CRCs at the end of the data signals to identify a single bad sample instead of a bad row. For example, the parity bit in the frame signal may be used to identify a data column in which an error has occurred. Similarly, the CRCs at the end of the data signals may be used to identify a data row in which the error has occurred. Using a columns and rows as coordinate references, the exact sample in which the error occurred can be identified. The processing chip 20 can, thus, identify the bad sample and discard or repair the bad sample instead of discarding the entire row. For example, by combining the CRC error, marking the bad row, and the parity error, marking the bad column, the processing chip 20 can pinpoint the error and repair single bit errors by taking an average of the correct neighboring samples.

The receiver module at the processing chip 20 may include a parity counter which counts a number of parity errors per ramp and determines whether to accept or reject and discard the ramp based on the counter. For example, the processing chip 20 may accept the ramp when the counter is below a threshold number or parity errors (e.g., less than two), and reject the ramp when the counter meets or exceeds the threshold (e.g., two or more).

Figure 9:
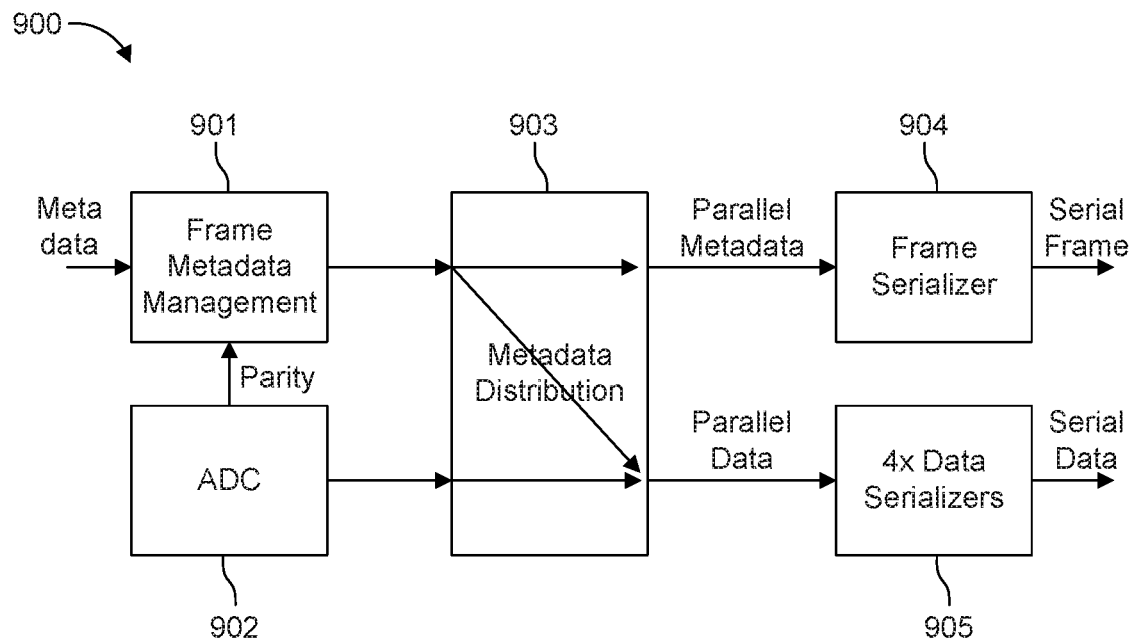
FIG. 9 shows a schematic block diagram of a communication interface circuit of a radar interface circuit at a transmitter side according to one or more embodiments.

FIG. 9 shows a schematic block diagram of a communication interface circuit 900 of the radar interface circuit 30 at a transmitter side according to one or more embodiments. The communication interface circuit 900 may be integrated at the MMIC radar chip (i.e., the RF frontend 10) and configured to transmit the serial frame signal and the serial data signals Data0-3 to a receiver side of the communication interface. The receiver side (not illustrated) may be integrated at a processor, such as processing chip 20, that is configured to process the frame signal and data signals.

The communication interface circuit 900 includes a frame metadata management unit 901, an ADC 902, a metadata distribution unit 903, a frame serializer 904, and data serializers 905.

The frame metadata management unit 901 receives metadata from the radar chip 10 and parity bits from the ADC 902 based on one or more radar samples (data frames) and provides the information to the metadata distribution unit 903. The ADC 902 further provides the radar data to the metadata distribution unit 903. In response to receiving the metadata and/or the parity bits from the frame metadata management unit 901, the metadata distribution unit 903 determines how to distribute the information.

For example, some types of metadata may be inserted into the data stream or metadata may be periodically inserted into the data stream, as described in the above examples. In this case, the metadata distribution unit 903 provides the metadata to the data serializers as part of the parallel data. In other cases, the metadata may be provided as parallel metadata to the frame serializer 904. In addition, the metadata distribution unit 903 may provide status bits, safety bits, and parity bits as parallel metadata to the frame serializer 904.

The frame serializer 904 serializes the parallel metadata into serial metadata and generates the serial frame signal, the duty cycle of which is modulated by the frame serializer 904 to transmit the additional information (e.g., the metadata, frame type, status bits, safety bits, and/or parity bits). Thus, the frame serializer 904 marks the end/start of frames and additionally encodes the frame signal with additional information. The frame serializer 904 may include a shift register having parallel inputs and a serial output such that it is configured as a 'parallel-in, serial-out' (PISO) unit. Specifically, the shift register uses the frame signal duty cycle to send serial metadata information.

In addition, the data serializers 905 include a data serializer for each data channel, each of which is configured to convert parallel data into serial data for transmission. Thus, each data serializer may include a shift register having parallel inputs and a serial output such that it is configured as a PISO unit.

Figure 10:
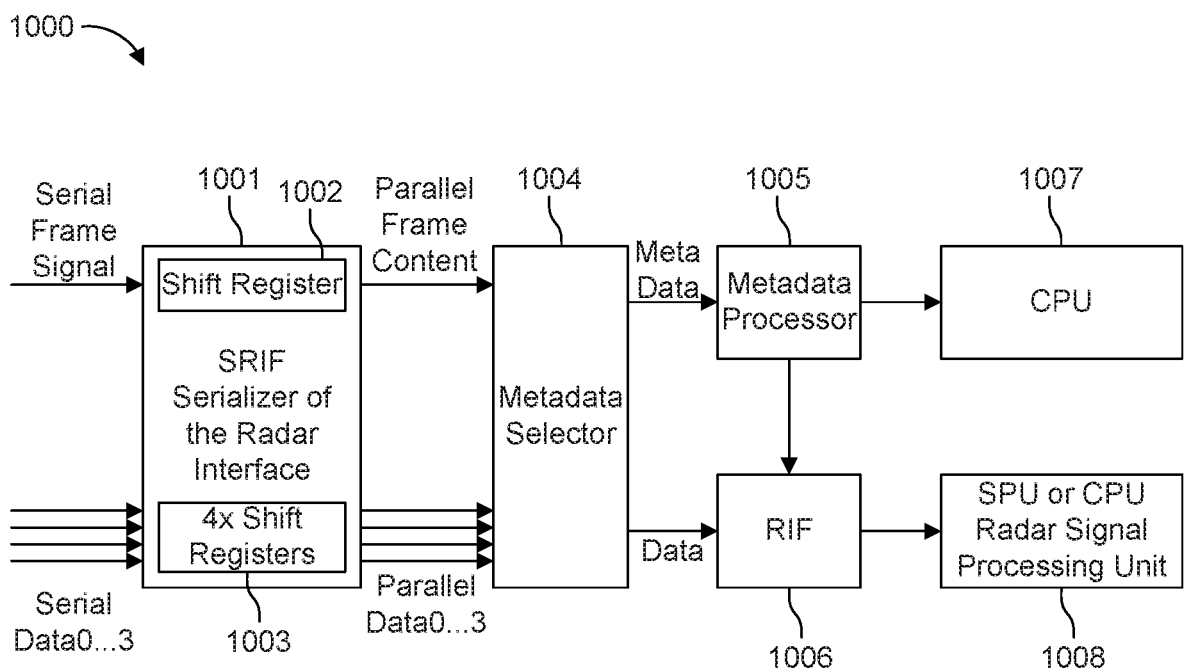
FIG. 10 shows a schematic block diagram of a communication interface circuit of the radar interface circuit at a receiver side according to one or more embodiments.

FIG. 10 shows a schematic block diagram of a communication interface circuit 1000 of the radar interface circuit 30 at a receiver side according to one or more embodiments. The communication interface circuit 1000 may be integrated at the processing chip 20. The communication interface circuit 1000 includes a shift register interface serializer 1001, a metadata selector 1004, a metadata processor 1005, a radar interface (RIF) unit 1006, a central processing unit (CPU) 1007, and a signal processing unit (SPU) 1008. The signal processing unit (SPU) 1008 may include one or more signal processing circuits, signal processing chains, or CPUs configured to process radar data as well as metadata. A signal processing circuit may include a digital signal processor (DSP).

The shift register interface serializer 1001 receives the data and the frame signal. The shift register interface serializer 1001 includes a frame signal shift register 1002 and a data shift register 1003 for each data channel Data0-3. The frame signal shift register 1002 converts the frame signal duty cycle into parallel metadata information (i.e., parallel frame content), and provides the parallel frame content to the metadata selector 1004. Similarly, the data shift registers 1003 converts the serial data signals Data0-3 into parallel data signals Data0-3, and provides the parallel data to the metadata selector 1004. The shift registers in general have serial inputs and parallel outputs such that they are configured as 'serial-in, parallel-out' (SIPO) units. Thus, they convert high speed serial signals into lower speed parallel signals.

In response to receiving the metadata in the parallel frame content, the metadata selector 1004 makes a determination how to handle the data in the data signals and the metadata in the frame content. For example, based on the metadata, the metadata selector 1004 may determine to send the metadata from the frame content to the metadata processor 1005 and to send the raw radar data in the parallel data signals Data0-3 to an RIF unit 1006.

The metadata processor 1005 is configured to process the metadata of send the metadata and/or additional information regarding the metadata to a CPU 1007. Specifically, the metadata processor 1005 is configured to decode the frame signal by determining which bits are 1 and which bits are 0. The metadata may include a status bit, a frame type, a parity bit, and/or a safety bit. For example, if status information or the safety bit in the metadata indicates an error, the metadata processor 1005 may provide the metadata alone with a warning signal to the CPU 1007 for additional handling of the error. In response, the CPU 1007 may initiate a shutdown or a reset of the radar chip.

In addition, depending on the received metadata, the metadata processor 1005 may send additional messages to the RIF unit 1006. For example, the additional messages may indicate the frame type (data type) and/or parity bit to the RIF unit 1006. In response to the frame type, the RIF unit 1006 can direct the data to one or more different signal processing units (SPUs) or CPUs 1008 that are configured to perform signal processing on one or more types of data. The SPUs and CPUs 1008 may also refer to a parity bit to perform a parity check on the data and may also use the parity bit along with CRCs to pinpoint a bad frame and repair it.

In addition to or in the alternative to varying the duty cycle, the signal length (frame length) of the frame signal may be varied to convey the aforementioned data information. In the event a variable frame length is used, the frame signal again serves as a hybrid control/data signal that provides control information as well as data information. For this reason, the frame signal has a control function as well as a data function and may be referred to as a limited data channel or a hybrid control-data channel in which control information and data are simultaneously transmitted therethrough. Thus, the embodiments take advantage of the fact that synchronous communications with the RIF interface unit 1006 contains the so called frame signal and uses the frame signal to transmit additional information.

Figure 11:
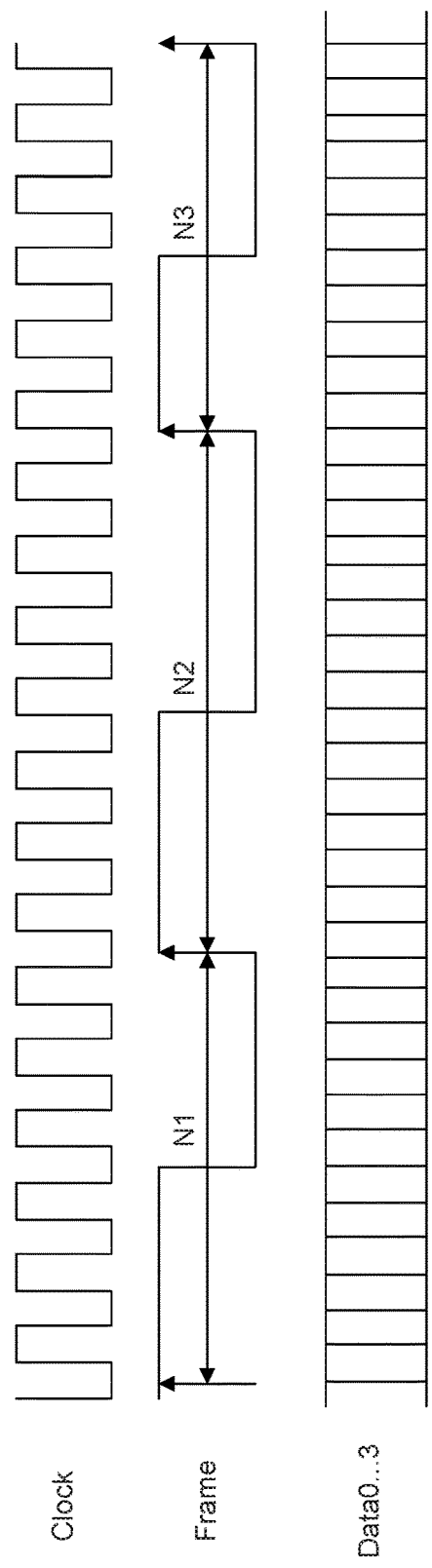
FIG. 11 is a signal diagram of a synchronous communication interface that includes a communication clock signal, a frame signal, and multiple data signals in parallel according to one or more embodiments.

Similar to FIG. 4, FIG. 11 is a signal diagram of a synchronous communication interface that includes a communication clock signal, a frame signal, and multiple data signals in parallel according to one or more embodiments. However, instead of using a variable duty cycle, the frame signal shown in FIG. 11 is implemented with a variable signal length, which may be also referred to as a variable frame length or variable signal period.

The frame signal includes two transition edge types, a rising edge transition and a falling edge transition. Each signal period includes one of each transition edge type. A first type of edge transition (i.e., either the rising edge type of the falling edge type) is used to indicate an end of one data frame (i.e., an end of a radar sample) and a beginning of the next data frame (i.e., a start of the next radar sample). The period between two consecutive transition edges of the same type denotes the signal length. Thus, the frame signal may be coded with different signal lengths (i.e., signal length codes) to convey data information, where different signal lengths have different meanings and thus convey different information. As shown in FIG. 11, three frame periods are shown each having a different signal length represented by signal length N1, N2, and N3.

Signal length codes may indicate a data type of the data being transmitted in the data lines corresponding to a frame of the frame signal. A transmitter circuit is configured to vary a frame length of the plurality of frame periods of the frame signal according to a mapping of the additional information to a plurality of discrete frame lengths. The frame lengths are discrete in that they are a certain number of bits in length, which is also representative of a number of clock cycles or pulses of the clock signal.

Each period of the control/frame signal is equal in duration to the length of a corresponding segment of the data signal. For example, if a corresponding segment of the data signal is a data sample, the period of the control signal synchronous at that time is equal to the length of the data sample, which in turn corresponds to the number of bits of the data sample. If the corresponding segment of the data signal is a pause, the period of the control signal synchronous at that time is equal to the length of the pause. Thus, each period of the control signal is synchronous (i.e., transmitted in parallel) with a data unit (e.g., data frame) or other type of segment in each data signal.

Different data types may have different data lengths. For example, ADC samples may be mixed with other different data types with different lengths. Other data types may include MMIC status information, MMIC register values, and extra CRCs for each data type. Accordingly, the data lines DATA0-3 may carry any of these types of data. Thus, the signal length of the frame signal corresponding to a data frame may be adjusted on a frame-by-frame basis to correspond to the length of the data frame. As a result, the signal length over a signal period may uniquely correspond to a particular type of data and may be used to indicate that data type.

In addition, the second type of edge transition (i.e., either the falling edge type of the rising edge type) is used to indicate the duty cycle of the frame signal in one signal period. The frame signal may be coded with different duty cycles to convey data information additional, where, as similarly described above, different duty cycles have different meanings and thus convey different information. For example, for those data types that have a same data length, the second type of edge transition may be used to discriminate between those types of data by assigning a different duty cycle to data types of the same data length. Those data types with the same data length may be referred to as a data type group, and the duty cycle may define a data subtype of a number of discrete data subtypes corresponding to a data type group.

A receiver uses the clock signal to count a first number of clock cycles during each frame period (i.e., the number of clock cycles from one first edge transition type to a consecutive one) and determines the signal length for each period according to the number of counted clock cycles. The receiver is configured to determine the data type or a data type group based the determined signal length by referring to a lookup table or similar processing technique.

In addition, the receiver may be configured to count a second number of clock signals from a first edge transition type to a consecutive second edge transition type in a signal period, and use the first number of clock cycles and the second number of clock cycles to thereby determine the duty cycle of the corresponding signal period. The receiver is configured to determine the data type based the determined signal length and the determined duty cycle corresponding to the same signal period by referring to a lookup table or similar processing technique.

As noted above, FIG. 7 shows an example signal diagram of serial signals transmitted by a synchronous communication interface according to one or more embodiments. In particular, the data signals Data0-3 carry ADC samples interleaved with metadata data2. Metadata in the data signal may include a MMIC status, MMIC register values, or an extra parity and CRC of two or more previous ADC samples (i.e., crc adc). When implementing a variable signal length, the signal length of the frame signal can be varied frame-by-frame (i.e., period-by-period) according to the data being transmitted in the corresponding data units.

Figure 12:
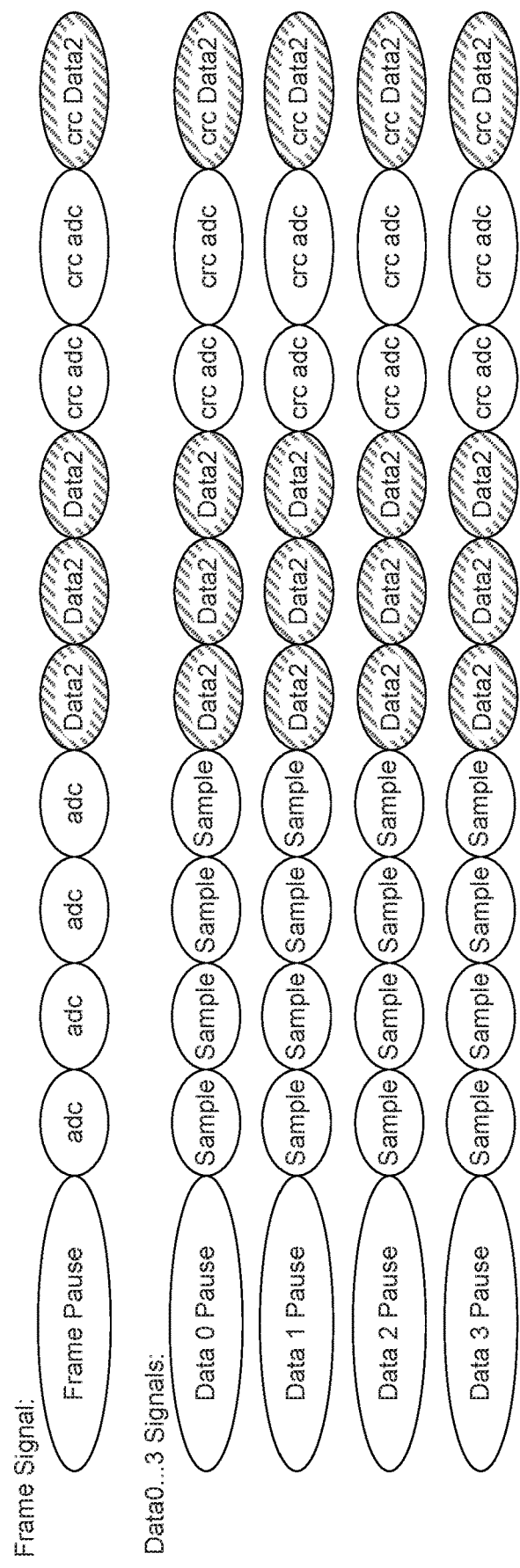
FIG. 12 shows another example signal diagram of serial signals transmitted by a synchronous communication interface according to one or more embodiments.

FIG. 12 shows another example signal diagram of serial signals transmitted by a synchronous communication interface according to one or more embodiments. Again, the data signals Data0-3 carry ADC samples interleaved with metadata data2. Metadata in the data signal may include a MMIC status, MMIC register values, a CRC of two or more previous ADC samples (i.e., crc adc), and an extra CRC for the metadata (i.e., crc data2)

As noted above, FIG. 9 shows a schematic block diagram of a communication interface circuit 900 of the radar interface circuit 30 at a transmitter side according to one or more embodiments. The communication interface circuit 900 may be integrated at the MMIC radar chip (i.e., the RF frontend 10) and configured to transmit the serial frame signal and the serial data signals Data0-3 to a receiver side of the communication interface. The receiver side (not illustrated) may be integrated at a processor, such as processing chip 20, that is configured to process the frame signal and data signals.

The communication interface circuit 900 includes the frame metadata management unit 901, the ADC 902, the metadata distribution unit 903, the frame serializer 904, and the data serializers 905.

The frame metadata management unit 901 receives metadata from the radar chip 10 and parity bits from the ADC 902 based on one or more radar samples (data frames) and provides the information to the metadata distribution unit 903. The ADC 902 further provides the radar data to the metadata distribution unit 903. In response to receiving the metadata and/or the parity bits from the frame metadata management unit 901, the metadata distribution unit 903 determines how to distribute the information. Thus, the metadata distribution unit 903 performs metadata management and interleaving.

For example, some types of metadata may be inserted into the data stream or metadata may be periodically inserted into the data stream, as described in the above examples. In this case, the metadata distribution unit 903 provides the metadata to the data serializers as part of the parallel data (i.e., interleaves metadata and ADC data). In other cases, the metadata may be provided as parallel metadata to the frame serializer 904 (i.e., concatenates metadata to ADC data). In addition, the metadata distribution unit 903 may provide status bits, safety bits, and parity bits as parallel metadata to the frame serializer 904.

The frame serializer 904 serializes the parallel metadata into serial metadata and generates the serial frame signal, the signal length and/or the duty cycle of which is modulated by the frame serializer 904 to transmit the additional information (e.g., the metadata, frame type, status bits, safety bits, and/or parity bits). Thus, the frame serializer 904 marks the end/start of frames and additionally encodes the frame signal with additional information by dynamically adjusting the signal length and/or the duty cycle thereof. The frame serializer 904 is configured to vary a frame length of the plurality of frame periods of the frame signal according to a mapping of the additional information to a plurality of discrete frame lengths. The frame lengths are discrete in that they are a certain number of bits in length, which is also representative of a number of clock cycles or pulses of the clock signal. The frame serializer 904 is configured to encode the control signal by selecting a discrete frame length of each frame period from the plurality of discrete frame lengths based on the additional information to be transmitted in the frame signal. The additional information corresponding to the data being transmitted in the data channels during a respective frame period.

In addition, the data serializers 905 include a data serializer for each data channel, each of which is configured to convert a parallel data stream into a serial data stream for transmission. Thus, each data serializer may include a shift register having parallel inputs and a serial output such that it is configured as a PISO unit.

Figure 13:
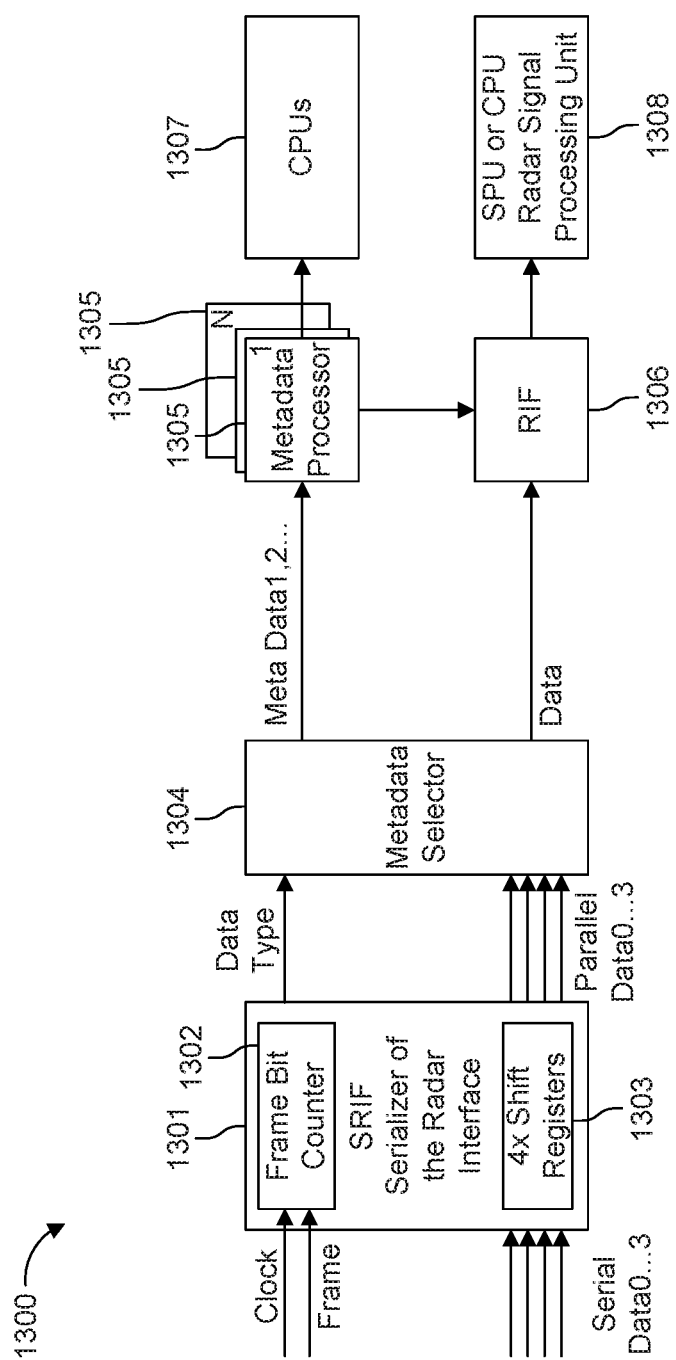
FIG. 13 shows a schematic block diagram of a communication interface circuit of the radar interface circuit at a receiver side according to one or more embodiments.

FIG. 13 shows a schematic block diagram of a communication interface circuit 1300 of the radar interface circuit 30 at a receiver side according to one or more embodiments. The communication interface circuit 1300 may be integrated at the processing chip 20. The communication interface circuit 1300 includes a shift register interface (SRIF) serializer 1301, a metadata selector 1304, metadata processors 1305, a radar interface (RIF) unit 1306, a central processing unit (CPU) 1307, and a signal processing unit (SPU) 1308. The signal processing unit (SPU) 1308 may include one or more signal processing circuits, signal processing chains, or CPUs configured to process radar data as well as metadata. A signal processing circuit may include a digital signal processor (DSP).

The shift register interface serializer 1301 is a serializer of the radar interface and it receives the data and the frame signal. The shift register interface serializer 1301 includes a frame bit counter 1302 and a data shift register 1303 for each data channel Data0-3. The frame bit counter 1302 counts the number of bits of the frame signal in a period between two consecutive transition edges of the same type to thereby determine the signal length. Since each clock pulse corresponds to one bit, the frame bit counter 1302 may count the number of clock pulses in the clock signal that occur in the period between two consecutive transition edges of the same type of the frame signal to determine the signal length of the frame signal for that data frame. The shift register interface serializer 1301 takes the determined signal length and determines additional information, such as data type, therefrom. The shift register interface serializer 1301 may then transmit the additional information, such as data type, to the metadata selector 1304.

In particular, the shift register interface serializer 1301 uses the clock signal to count a first number of clock cycles during each frame period (i.e., the number of clock cycles from one first edge transition type to a consecutive one) and determines the signal length for each period according to the number of counted clock cycles. The shift register interface serializer 1301 is configured to determine the data type or a data type group based the determined signal length by referring to a lookup table or similar processing technique.

In addition, the shift register interface serializer 1301 may be configured to count a second number of clock signals from a first edge transition type to a consecutive second edge transition type in a signal period, and use the first number of clock cycles and the second number of clock cycles to thereby determine the duty cycle of the corresponding signal period. The shift register interface serializer 1301 is configured to determine the data type based the determined signal length and the determined duty cycle corresponding to the same signal period by referring to a lookup table or similar processing technique.

Similarly, the data shift registers 1303 convert the serial data signals Data0-3 into parallel data signals Data0-3, and provide the parallel data to the metadata selector 1304. The shift registers in general have serial inputs and parallel outputs such that they are configured as 'serial-in, parallel-out' (SIPO) units. Thus, they convert high speed serial signals into lower speed parallel signals.

In response to receiving the additional information (e.g., data type), the metadata selector 1304 makes a determination how to handle the data in the data signals and the metadata in the frame content. For example, based on the additional information, the metadata selector 1304 may determine to send the metadata from the frame content to the one of the N metadata processors 1305 and to send the raw radar data in the parallel data signals Data0-3 to an RIF unit 1306. Thus, depending on the frame length, the different types of data are separated and sent to dedicated signal paths.

The metadata processors 1305 are configured to process the metadata originally received in a data stream and/or the additional information. N metadata processors may be provided, each configured to process a different type of data, where N is an integer and represents a number of differently processed data types. Once processed, a corresponding metadata processor 1305 may transmit processed metadata or information derived therefrom to either the RIF unit 1306 and/or one or more CPU 1307. Specifically, a metadata processor 1305 is configured to decode the frame signal by determining which bits are 1 and which bits are 0. The metadata may include a status bit, a frame type, a parity bit, and/or a safety bit. For example, if status information or the safety bit in the metadata indicates an error, the metadata processor 1305 may provide the metadata alone with a warning signal to the CPU 1307 for additional handling of the error. In response, the CPU 1307 may initiate a shutdown or a reset of the radar chip.

In addition, depending on the received metadata, the metadata processor 1305 may send additional messages to the RIF unit 1306. For example, the additional messages may indicate the frame type (data type) and/or parity bit to the RIF unit 1306. In response to the frame type, the RIF unit 1306 can direct the data to one or more different signal processing units (SPUs) or CPUs 1308 that are configured to perform signal processing on one or more types of data. The SPUs and CPUs 1308 may also refer to a parity bit to perform a parity check on the data and may also use the parity bit along with CRCs to pinpoint a bad frame and repair it.

The following additional embodiments are provided:

1. A synchronous communication interface, comprising: at least one data channel configured to carry a data signal comprising a plurality of data units; a control channel parallel to the at least one data channel, the control channel configured to carry a control signal for the at least one data channel; and a circuit configured to generate the control signal that includes control information that defines each of the plurality of data units in each data signal and further includes additional information, wherein the circuit is configured to vary a duty cycle of the control signal according to a mapping of the additional information to a plurality of discrete duty cycle states.

2. The synchronous communication interface of embodiment 1, wherein the circuit is configured to encode the control signal by selecting a discrete duty cycle state of each duty cycle from the plurality of discrete duty cycle states based on the additional information.

3. The synchronous communication interface of embodiment 1, further comprising: a transmitter configured to synchronously transmit each data signal and the control signal, wherein the transmitter is configured to transmit one of the plurality of data units in each data signal synchronously with a period of a plurality of periods of the control signal.

4. The synchronous communication interface of embodiment 1, wherein the control signal is a pulse width modulated (PWM) signal and the plurality of discrete duty cycle states are discrete pulse widths corresponding to the duty cycle of the control signal.

5. The synchronous communication interface of embodiment 4, wherein each first transition edge of the control signal indicates an end of a current data unit of the plurality of data units in each data signal, and each second transition edge of the control signal defines the duty cycle of the control signal corresponding to the additional information.

6. The synchronous communication interface of embodiment 5, wherein the first transition edge of the control signal indicates the end of the current data unit and a start of a next data unit of the plurality of data units in each data signal.

7. The synchronous communication interface of embodiment 5, wherein the circuit is configured to generate the control signal such that a period between two subsequent first transition edges is constant over a plurality of periods of the control signal and a period between two subsequent second transition edges is variable over the plurality of periods according to the plurality of discrete duty cycle states.

8. The synchronous communication interface of embodiment 1, wherein the control signal is a frame signal and the plurality of data units are a plurality of data frames.

9. The synchronous communication interface of embodiment 1, wherein the additional information is metadata corresponding to each data signal.

10. The synchronous communication interface of embodiment 1, wherein the additional information is metadata corresponding to a system status indicating a status of at least one system parameter, wherein at least a first one of the plurality of discrete duty cycle states indicates that the at least one system parameter is in a normal operating condition and at least a second one of the plurality of discrete duty cycle states indicates that the at least one system parameter is in an abnormal operating condition.

11. The synchronous communication interface of embodiment 10, wherein the at least one system parameter includes at least one of a temperature, a voltage, a system clock, and a lock status of a phase-lock loop.

12. The synchronous communication interface of embodiment 1, wherein the additional information indicates a data type of a corresponding data unit in each data signal, wherein at least a first one of the plurality of discrete duty cycle states indicates a first data type and at least a second one of the plurality of discrete duty cycle states indicates a second data type different from the first data type.

13. The synchronous communication interface of embodiment 1, wherein the at least one data channel includes a plurality of data channels, and the additional information is a parity bit corresponding to at least two data units that are synchronous with a period of the control signal, the at least two data units being in different data signals.

14. The synchronous communication interface of embodiment 13, wherein at least a first one of the plurality of discrete duty cycle states indicates a first parity bit value and at least a second one of the plurality of discrete duty cycle states indicates a second parity bit value.

15. The synchronous communication interface of embodiment 1, wherein the additional information includes content of registers of an integrated circuit.

16. A synchronous communication interface, comprising: at least one data channel configured to carry a data signal comprising a plurality of data units; a control channel parallel to the at least one data channel, the control channel configured to carry a control signal that includes control information that defines each of the plurality of data units in each data signal and further includes additional information, wherein the control signal has a duty cycle that varies according to a mapping of the additional information to a plurality of discrete duty cycle states; and a circuit configured to decode the control signal, including identifying each of the plurality of data units in each data signal from the control signal, determining the duty cycle of the control signal, and further determining the additional information from the determined duty cycle based on the mapping of the additional information to the plurality of discrete duty cycle states.

17. The synchronous communication interface of embodiment 16, wherein: each data signal includes a cyclic redundancy check (CRC); the additional information is a parity bit corresponding to at least two data units that are synchronous with a period of the control signal, wherein at least a first one of the plurality of discrete states indicates a first parity bit value and at least a second one of the plurality of discrete states indicates a second parity bit value; and the circuit is configured to determine a location of a data error based on the CRC and the parity bit.

18. A method of synchronous communication, the method comprising: synchronously transmitting at least one data signal comprising a plurality of data units, in parallel with a control signal for the at least one data signal; and generating the control signal that includes control information that defines each of the plurality of data units in each data signal and includes additional information, including varying a duty cycle of the control signal according to a mapping of the additional information to a plurality of discrete duty cycle states.

19. The method of embodiment 18, wherein: generating the control signal includes encoding the control signal by selecting a discrete duty cycle state from the plurality of discrete duty cycle states based on the additional information, and applying the duty cycle based on the selected discrete duty cycle state.

20. The method of embodiment 18, wherein: the control signal is a pulse width modulated (PWM) signal and the plurality of discrete duty cycle states are discrete pulse widths corresponding to the duty cycle; each first transition edge of the control signal indicates an end of a current data unit of the plurality of data units in each data signal; and each second transition edge of the control signal defines the duty cycle corresponding to the additional information.

21. A synchronous communication interface, comprising: at least one data channel configured to carry a data signal comprising a plurality of data units; a control channel parallel to the at least one data channel, the control channel configured to carry a control signal for the at least one data channel; and a circuit configured to generate the control signal comprising a plurality of frame periods, wherein the control signal includes control information that defines each of the plurality of data units in each data signal and further includes additional information, wherein the circuit is configured to vary a frame length of the plurality of frame periods of the control signal according to a mapping of the additional information to a plurality of discrete frame lengths.

22. The synchronous communication interface of embodiment 21, wherein the circuit is configured to encode the control signal by selecting a discrete frame length of each frame period from the plurality of discrete frame lengths based on the additional information.

23. The synchronous communication interface of embodiment 21, further comprising: a transmitter configured to synchronously transmit each data signal and the control signal, wherein the transmitter is configured to transmit one of the plurality of data units in each data signal synchronously with a frame period of the plurality of periods of the control signal.

24. The synchronous communication interface of embodiment 21, wherein: the control signal is a pulse width modulated (PWM) signal comprising a first type of transition edges and a second type of transition edges; and the frame length is defined by two consecutive transition edges of a same type.

25. The synchronous communication interface of embodiment 24, wherein each first type of transition edge of the control signal indicates an end of a current data unit of the plurality of data units in each data signal, and each second type of transition edge of the control signal defines a duty cycle of the control signal corresponding to one of the plurality of frame periods.

26. The synchronous communication interface of embodiment 25, wherein the circuit is configured to vary the duty cycle of the control signal for each of the plurality of frame periods according to a mapping of further additional information to a plurality of discrete duty cycle states.

27. The synchronous communication interface of embodiment 21, wherein: the circuit is configured to vary a duty cycle of the control signal for each of the plurality of frame periods according to a mapping of further additional information to a plurality of discrete duty cycle states; and the circuit is configured to encode the control signal by selecting a discrete duty cycle state of each duty cycle from the plurality of discrete duty cycle states based on the further additional information.

28. The synchronous communication interface of embodiment 27, wherein: the additional information indicates a data type group of a corresponding data unit in each data signal, wherein at least a first one of the plurality of discrete frame lengths indicates a first data type group and at least a second one of the plurality of discrete frame lengths indicates a second data type group different from the first data type group; and the further additional information indicates a data subtype of a corresponding data unit in each data signal, wherein at least a first one of the plurality of discrete duty cycle states indicates a first data subtype of a first data type group and at least a second one of the plurality of discrete duty cycle states indicates a second data subtype, different from the first data subtype, of the first data type group.

29. The synchronous communication interface of embodiment 21, wherein the control signal is a frame signal and the plurality of data units are a plurality of data frames.

30. The synchronous communication interface of embodiment 21, wherein the additional information is metadata corresponding to each data signal.

31. The synchronous communication interface of embodiment 21, wherein the additional information indicates a data type of a corresponding data unit in each data signal, wherein at least a first one of the plurality of discrete frame lengths indicates a first data type and at least a second one of the plurality of discrete frame lengths indicates a second data type different from the first data type.

32. A synchronous communication interface, comprising: at least one data channel configured to carry a data signal comprising a plurality of data units; a control channel parallel to the at least one data channel, the control channel configured to carry a control signal that includes control information that defines each of the plurality of data units in each data signal and further includes additional information, wherein the control signal comprises a plurality of frame periods that have corresponding frame lengths that vary according to a mapping of the additional information to a plurality of discrete frame lengths; and a circuit configured to decode the control signal, including identifying each of the plurality of data units in each data signal from the control signal, determining the corresponding frame length of the control signal for each of the plurality of frame periods, and further determining the additional information from the determined corresponding frame length based on the mapping of the additional information to the plurality of discrete frame lengths.

33. A method of synchronous communication, the method comprising: synchronously transmitting at least one data signal comprising a plurality of data units, in parallel with a control signal for the at least one data signal; and generating the control signal that includes control information that defines each of the plurality of data units in each data signal and includes additional information, including varying a frame length of the control signal according to a mapping of the additional information to a plurality of discrete frame lengths.

34. The method of embodiment 33, wherein: generating the control signal includes encoding the control signal by selecting a discrete frame length from the plurality of discrete frame lengths based on the additional information, and applying the frame length based on the selected discrete frame length.

35. The method of embodiment 34, further comprising: decoding the control signal, including identifying each of the plurality of data units in each data signal from the control signal, determining the corresponding frame length of the control signal for each of a plurality of frame periods, and further determining the additional information from the determined corresponding frame length based on the mapping of the additional information to the plurality of discrete frame lengths.

Embodiments take advantage of the fact that the RIF interface contains the so called FRAME signal, which is used only to mark the start and the end of each ADC sample. The duty cycle and the duration of the FRAME signal for the data frames are constant in conventional systems, but in the described embodiments can be used to distinguish between various types of data by using different duty cycles and/or different lengths.

The described embodiments improve an existing radar interface providing a method to distinguish between different types of data being sent without adding the bits in the data stream itself and thereby reducing the bandwidth. This capability allows a radar chip to send data additionally to the raw basic radar data and to serve as a back channel to send the responses from a command interface, like Serial Peripheral Interface (SPI).

Although embodiments described herein relate to radar communications, it is to be understood that other implementations may relate to other types of communications that use a control signal to identify or indicate the data units in a data signal. Thus, the concepts described in the above embodiments are not limited solely to radar communications or radar data, but may be extended to other types of communication scenarios, other types of data, and other implementations.

In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more CPUs, DSPs, general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A synchronous communication interface, comprising:
at least one data channel configured to carry a data signal comprising a plurality of data units;
a control channel parallel to the at least one data channel, the control channel configured to carry a control signal for the at least one data channel; and
a circuit configured to generate the control signal that includes control information that defines each of the plurality of data units in each data signal and further includes additional information,
wherein the circuit is configured to vary a duty cycle of the control signal according to a mapping of the additional information to a plurality of discrete duty cycle states, and
wherein each period of the control signal is synchronous with a length of a corresponding data unit of the plurality of data units.

2. The synchronous communication interface of claim 1, wherein the circuit is configured to encode the control signal by selecting a discrete duty cycle state of each duty cycle from the plurality of discrete duty cycle states based on the additional information.

3. The synchronous communication interface of claim 1, further comprising:
a transmitter configured to synchronously transmit each data signal and the control signal, wherein the transmitter is configured to transmit one of the plurality of data units in each data signal synchronously with a period of a plurality of periods of the control signal.

4. The synchronous communication interface of claim 1, wherein the control signal is a pulse width modulated (PWM) signal and the plurality of discrete duty cycle states are discrete pulse widths corresponding to the duty cycle of the control signal.

5. A synchronous communication interface, comprising:
at least one data channel configured to carry a data signal comprising a plurality of data units;
a control channel parallel to the at least one data channel, the control channel configured to carry a control signal for the at least one data channel; and
a circuit configured to generate the control signal that includes control information that defines each of the plurality of data units in each data signal and further includes additional information,
wherein the circuit is configured to vary a duty cycle of the control signal according to a mapping of the additional information to a plurality of discrete duty cycle states,
wherein the control signal is a pulse width modulated (PWM) signal and the plurality of discrete duty cycle states are discrete pulse widths corresponding to the duty cycle of the control signal, and
wherein each first transition edge of the control signal indicates an end of a current data unit of the plurality of data units in each data signal, and each second transition edge of the control signal defines the duty cycle of the control signal corresponding to the additional information.

6. The synchronous communication interface of claim 5, wherein the first transition edge of the control signal indicates the end of the current data unit and a start of a next data unit of the plurality of data units in each data signal.

7. The synchronous communication interface of claim 5, wherein the circuit is configured to generate the control signal such that a period between two subsequent first transition edges is constant over a plurality of periods of the control signal and a period between two subsequent second transition edges is variable over the plurality of periods according to the plurality of discrete duty cycle states.

8. The synchronous communication interface of claim 1, wherein the control signal is a frame signal and the plurality of data units are a plurality of data frames, wherein the frame signal indicates an end of one data frame and a beginning of a next data frame for the plurality of data frames.

9. The synchronous communication interface of claim 1, wherein the additional information is metadata corresponding to each data signal.

10. The synchronous communication interface of claim 1, wherein the additional information is metadata corresponding to a system status indicating a status of at least one system parameter, wherein at least a first one of the plurality of discrete duty cycle states indicates that the at least one system parameter is in a normal operating condition and at least a second one of the plurality of discrete duty cycle states indicates that the at least one system parameter is in an abnormal operating condition.

11. The synchronous communication interface of claim 10, wherein the at least one system parameter includes at least one of a temperature, a voltage, a system clock, and a lock status of a phase-lock loop.

12. The synchronous communication interface of claim 1, wherein the additional information indicates a data type of a corresponding data unit in each data signal, wherein at least a first one of the plurality of discrete duty cycle states indicates a first data type and at least a second one of the plurality of discrete duty cycle states indicates a second data type different from the first data type.

13. The synchronous communication interface of claim 1, wherein the at least one data channel includes a plurality of data channels, and the additional information is a parity bit corresponding to at least two data units that are synchronous with a period of the control signal, the at least two data units being in different data signals.

14. The synchronous communication interface of claim 13, wherein at least a first one of the plurality of discrete duty cycle states indicates a first parity bit value and at least a second one of the plurality of discrete duty cycle states indicates a second parity bit value.

15. The synchronous communication interface of claim 1, wherein the additional information includes content of registers of an integrated circuit.

16. A method of synchronous communication, the method comprising:
synchronously transmitting at least one data signal comprising a plurality of data units, in parallel with a control signal for the at least one data signal; and
generating the control signal that includes control information that defines each of the plurality of data units in each data signal and includes additional information, including varying a duty cycle of the control signal according to a mapping of the additional information to a plurality of discrete duty cycle states,
where each period of the control signal is synchronous with a length of a corresponding data unit of the plurality of data units.

17. The method of claim 16, wherein:
generating the control signal includes encoding the control signal by selecting a discrete duty cycle state from the plurality of discrete duty cycle states based on the additional information, and applying the duty cycle based on the selected discrete duty cycle state.

18. The method of claim 16, wherein:
the control signal is a pulse width modulated (PWM) signal and the plurality of discrete duty cycle states are discrete pulse widths corresponding to the duty cycle,
each first transition edge of the control signal indicates an end of a current data unit of the plurality of data units in each data signal, and
each second transition edge of the control signal defines the duty cycle corresponding to the additional information.

19. A synchronous communication interface, comprising:
at least one data channel configured to carry a data signal comprising a plurality of data units;
a control channel parallel to the at least one data channel, the control channel configured to carry a control signal for the at least one data channel;
a clock channel parallel to the at least one data channel and the control channel, the clock channel configured to carry a clock signal used for synchronizing communications between a transmitter and a receiver; and
a circuit configured to generate the control signal that includes control information that defines each of the plurality of data units in each data signal and further includes additional information,
wherein the circuit is configured to vary a duty cycle of the control signal according to a mapping of the additional information to a plurality of discrete duty cycle states.

20. The synchronous communication interface of claim 19, where each period of the control signal is synchronous with a length of a corresponding data unit.

21. The synchronous communication interface of claim 19, wherein the control signal is a frame signal and the plurality of data units are a plurality of data frames, wherein the frame signal indicates an end of one data frame and a beginning of a next data frame for the plurality of data frames.

22. The synchronous communication interface of claim 19, wherein:
the control signal is a pulse width modulated (PWM) signal and the plurality of discrete duty cycle states are discrete pulse widths corresponding to the duty cycle of the control signal, and
each first transition edge of the control signal indicates an end of a current data unit of the plurality of data units in each data signal, and each second transition edge of the control signal defines the duty cycle of the control signal corresponding to the additional information.

* * * * *